(12) United States Patent
Cooper et al.

(10) Patent No.: US 8,272,048 B2
(45) Date of Patent: Sep. 18, 2012

(54) RESTRICTION OF PROGRAM PROCESS CAPABILITIES

(75) Inventors: Simon Cooper, Sunnyvale, CA (US); Nick Lane-Smith, San Francisco, CA (US); Joshua Osborne, Boulder Creek, CA (US)

(73) Assignee: Apple Inc., Cupertino, CA (US)

( * ) Notice: Subject to any disclaimer, the term of this patent is extended or adjusted under 35 U.S.C. 154(b) by 1411 days.

(21) Appl. No.: 11/462,680

(22) Filed: Aug. 4, 2006

(65) Prior Publication Data

US 2008/0127292 A1  May 29, 2008

(51) Int. Cl.
*G06F 7/04* (2006.01)
*G06F 9/46* (2006.01)

(52) U.S. Cl. .......................................... 726/17; 718/100
(58) Field of Classification Search .................... 726/17; 718/100
See application file for complete search history.

(56) References Cited

U.S. PATENT DOCUMENTS

| | | | |
|---|---|---|---|
| 5,974,549 A | 10/1999 | Golan | |
| 6,393,605 B1 * | 5/2002 | Loomans | 717/121 |
| 6,405,255 B1 * | 6/2002 | Stoltz et al. | 709/231 |
| 6,823,460 B1 * | 11/2004 | Hollander et al. | 726/3 |
| 6,889,167 B2 * | 5/2005 | Curry, III | 702/183 |
| 7,058,786 B1 * | 6/2006 | Oliveri | 711/203 |
| 7,089,418 B1 | 8/2006 | Ellison et al. | |
| 7,146,305 B2 | 12/2006 | van der Made | |
| 7,162,715 B1 | 1/2007 | Whittaker et al. | |
| 7,191,440 B2 | 3/2007 | Cota-Robles et al. | |
| 7,360,213 B1 * | 4/2008 | Alfieri | 718/100 |
| 7,484,245 B1 * | 1/2009 | Friedman et al. | 726/27 |
| 7,519,814 B2 * | 4/2009 | Rochette et al. | 713/167 |
| 7,673,137 B2 * | 3/2010 | Satterlee et al. | 713/164 |
| 2003/0120935 A1 * | 6/2003 | Teal et al. | 713/188 |
| 2004/0064759 A1 * | 4/2004 | McGuire et al. | 714/39 |
| 2004/0133777 A1 | 7/2004 | Kiriansky et al. | |
| 2004/0194104 A1 * | 9/2004 | Beresnevichiene et al. | 718/100 |
| 2006/0021029 A1 | 1/2006 | Brickell et al. | |
| 2006/0069692 A1 * | 3/2006 | Pernia | 707/100 |
| 2006/0101413 A1 | 5/2006 | Kinno et al. | |
| 2006/0146057 A1 * | 7/2006 | Blythe | 345/506 |
| 2007/0101435 A1 * | 5/2007 | Konanka et al. | 726/27 |
| 2008/0005297 A1 * | 1/2008 | Kjos et al. | 709/223 |
| 2008/0016339 A1 | 1/2008 | Shukla | |
| 2009/0106754 A1 * | 4/2009 | Liu et al. | 718/1 |

OTHER PUBLICATIONS

Kamp, Poul-Henning, et al., "Jails: Confiining the omnipotent root", *The FreeBSD Project*, 15 Pages, 2000.
Provos, Niels, "Improving Host Security with System Call Policies", *CITI Technical Report 02-3*, (Nov. 11, 2002),15 Pages.

(Continued)

*Primary Examiner* — Techane Gergiso
(74) *Attorney, Agent, or Firm* — Womble Carlyle Sandridge & Rice LLP

(57) ABSTRACT

This document describes systems and methods for restricting program process capabilities. In some implementations, the capabilities are restricted by limiting the rights or privileges granted to an application. A plurality of rules may be established for a program, or for a group of programs, denying that program the right to take actions which are outside of the actions needed to implement its intended functionality. A security policy is implemented to test actions initiated in response to an application against the rules to enable decisions restricting the possible actions of the program. Embodiments are disclosed which process the majority of decisions regarding actions against a security profile through use of a virtual machine. In some embodiments, the majority of decisions are resolved within the kernel space of an operating system.

18 Claims, 7 Drawing Sheets

OTHER PUBLICATIONS

Stiegler, Marc, et al., "Polaris: Virus Safe Computing for Windows XP", *HP Invent, Mobile and Media Systems Laboratory, HPL-2004-221*, (Dec. 1, 2004), 1-9.

Bowen, Thomas F., et al., "Remediation of Application-Specific Security Vulnerabilities at Runtime", IEEE Xplore, (2000), 59-67.

Butt, Ali Raza, et al., "Grid-computing portals and security issues", Journal of Parallel and Distributed Computing, (2003), 1006-1014.

Rajagopalan, Mohan, et al., "Authemticated System Calls", Proceedings of the 2005 International Conference on Dependable Systems and Networks (DSN05), (2005), 1-10.

* cited by examiner

RESTRICTION OF PROGRAM PROCESS CAPABILITIES

TECHNICAL FIELD

The invention relates generally to the field of security software, and more specifically to methods and systems to provide restriction of program process capabilities. In some preferred embodiments, the process restrictions may be provided automatically for one or more processes implemented on a processor-based device.

BACKGROUND

Security concerns for all types of processor-based electronic devices, and particularly for computing devices, have become a significant concern. While some concerns may relate to detrimental actions which may be undertaken by defective code implemented by such devices, the greater concerns relate to the ramifications of various types of attacks made upon such devices through malicious code, including code conventionally known in the field by a number of names, including "viruses", "worms", "Trojan horses", "spyware", "adware", and others. Such malicious code can have effects ranging from relatively benign, such as displaying messages on a screen, or taking control of limited functions of a device; to highly destructive, such as taking complete control of a device, running processes, transmitting and/or deleting files, etc. Virtually any type of imaginable action on a processor-based device has been the subject of attacks by malicious code.

Many of these attacks are labeled at computing devices, such as processor-based systems such as workstations, servers, desktop computers, notebook and handheld computers, and other similar devices. Many of these computing devices can run one or more application programs ("applications") which a user may operate to perform a set of desired functions. However, such attacks are not limited to such computing devices. A broader group of various types of processor-based devices (or "processor devices"), such as cell phones; personal digital assistants ("PDA's"); music and video players; network routers, switches or bridges; and other devices utilizing a microprocessor, microcontroller, or a digital signal processor (in addition to computing devices, discussed separately above), to execute coded instructions have been the subjects of attacks by malicious code. A number of methodologies have been used in an attempt to reduce or eliminate both the attacks and influence of malicious or defective code. Generally, these methodologies include detection, prevention, and mitigation. Specifically, these methodologies range from attempts to scan, identify, isolate, and possibly delete malicious code before it is introduced to the system or before it does harm (such as is the objective of anti-virus software, and the like), to restricting or containing the actions which may be taken by processes affected by malicious or defective code.

One such containment system, implemented on a UNIX system, is a system known as Systrace. The Systrace system is described in the publication: "Improving Host Security With System Call Policy", by Niels Provos, Center for Information Technology Integration, University of Michigan, Nov. 11, 2002. The Systrace system seeks to establish a containment policy for an application by intercepting all system calls made by the application at a high level, specifically at the transition into the kernel layer of a computer operating system, such as at the system call application program interface ("API") level. Once a system call is identified at such interface, the call is compared to an established policy identifying calls that the application should need to make in order to perform its intended functions. If the system call seeks to take an action which is not one which the application would normally need to take, as determined by the established system policy, then the action will not be permitted.

The Systrace containment system, however, suffers from some disadvantages, a few of which are the following. One such disadvantage is that not all actions pass through the system call API interface. Thus, it is possible that actions may be initiated in the kernel that are not monitored by Systrace. Additionally, intercepting system calls at this high level does not allow the consideration of as much information regarding the system calls as would be desirable for a system to make an optimally "informed" decision. Further, because the system calls are intercepted as they enter the kernel, it is possible that as to any specific system call, there may be a difference in the propriety of the call dependent upon what calls may have preceded the call in question. The Systrace system does not track changing context from one system call to another, so may not properly filter some system calls (like those that operate on a file descriptor rather than filename).

Accordingly, it would be desirable to have a system which intercepts operations in the kernel before they execute, and preferably implementing such operation interception after the arguments for such operations are at least partially identified.

SUMMARY OF THE INVENTION

The present invention provides improved methods and systems for containment of applications and other programs in processor-based devices. For clarity of illustration herein, selected embodiments of the invention are described in the context of a computing device, and also in the context of methodologies implemented at least in part in the operating system ("OS") of the computing device. Such description is illustrative only, and those skilled in the art will recognize that the methods and processes of the embodiments described herein are not limited to use in an operating system or of a computing device.

In the illustrative embodiments discussed herein, the method may include establishing a profile including one or more privileges or policies associated with the program to be operated by the computing device, with those policies being representative of actions which the program should be enabled to perform if it is to perform its intended functionalities. In addition, the policies may also establish actions which the program should not ever be entitled to perform and/or actions which the program may be entitled to perform under certain situations with certain limitations, but not under other situations or under other conditions. In the described embodiments, the process will monitor actions attempted by that program when it is operated, and at least as to certain types of initiated kernel operations a determination will be made as to whether the monitored operations initiated by the program are consistent with the policies associated with the program. In the event that such initiated operations are consistent with the established policies, then the operations will be allowed to complete. If the initiated operations are inconsistent with the determined policies, then the operations will be denied. The effect of containing the actions of the application on the computing device in this manner will be that potentially detrimental or otherwise undesirable actions do not occur. As noted above, in certain preferred implementations, unlike where system calls might be intercepted at the system call API level, all operations will be intercepted, or trapped, in the kernel, at a point where the initiated action will be taken. Thus, these preferred implementations will intercept initiated kernel operations at a point at which the arguments associated with the system call have been, in most cases, at least partially resolved. For example, a system call to read a file will have the file location at least partially resolved. Another distinction in the trapping of kernel operations in the kernel is that a single system call at the system call API interface will in many cases generate multiple kernel operations that may be trapped, depending upon the established security profile.

For example, in UNIX-based systems running FreeBSD, MAC OS X or similar systems, kernel operations will be trapped at the mandatory access control hook ("MAC hook") level.

In certain embodiments of the described containment system implemented on computing devices, the above may be implemented under the control, at least in part, of the operating system of the device. Additionally, in the described embodiments implemented as part of a computing device operating system, it has been found desirable to perform a correlation of the intercepted kernel operations with policies associated with the specific program within the kernel layer of the operating system. While the above system may be used with any program operating on a processor-based device, it is believed that the system has particular applicability to containment of user level applications run on such devices.

DETAILED DESCRIPTION

Figure 1:
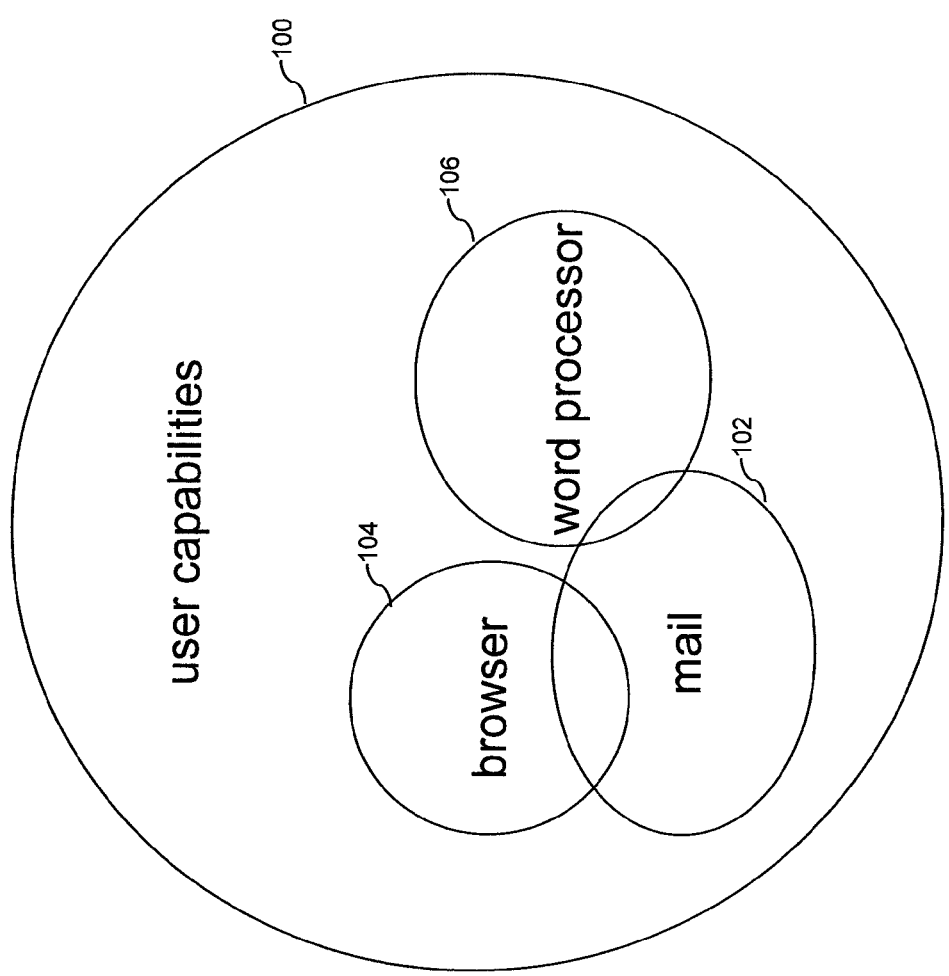
FIG. 1 illustrates a Venn diagram of the capabilities of contained applications as a subset of a user's capabilities.

Methods and systems to automatically restrict process capabilities in an operating system environment are described. In the following description, for purposes of explanation, numerous specific details are set forth in order to provide an understanding of various embodiments of the inventive subject matter. It will be evident, however, to one skilled in the art that embodiments of the inventive subject matter may be practiced without these specific details.

For the purposes of this specification, "processing system" includes a system using a processor, microcontroller or digital signal processor and having the capability of running a "program", which is a set of executable machine code. A "program" as used herein, includes user-level applications as well as system-directed applications or daemons.

Processing systems include communication and electronic devices such as cell phones, music players, and PDAs. Processing systems also include "computing devices" (as discussed earlier herein)

A "system call" includes user-available library functions. Once a system call passes into the kernel, it will initiate one or more internal kernel functions that may represent one or more atomic or fundamental kernel operations needed to execute the system call. Examples of user-available library functions include the BSD system call API for UNIX systems, the Macintosh Toolbox for classic Apple Macintosh systems, and the Windows API for Microsoft Windows compatible system, which includes various Windows libraries such as, MFC, OLE, COM, ISAPI, and the Windows SDK for systems running Microsoft's Windows family of operating systems. An API may provide for translation or mapping from a library function to one or more of the underlying operating system or kernel operations. In general, a library command or system call is implemented by simple or atomic kernel operations. For example, in a UNIX operating environment, when an open ( ) system call is executed, in order to implement the system call, one or more kernel operations or events are performed, such as checking file and directory policies, allocating and managing tables in the kernel to define or update file entries, and assigning a file pointer or descriptor. As another example, when execve (2) system call is executed, several kernel operations are initiated, such as a vnode lookup hook, a check vnode exec, an "about to exec" hook, a "has just exec'ed" hook, and a "create credential" hook. Thus, intercepting operations at the kernel level facilitates far greater granularity of control over system operations.

Operational Overview

In typical computing device and processing system platforms, software executing on a platform can be roughly divided into operational software (e.g., an operating system) and application software (e.g., user programs). Operating software can include packages such as Mac OS X of Apple, Inc., Microsoft Windows of Microsoft, Inc., UNIX, developed by Ken Thompson and Dennis Ritchie of AT&T Bell Labs, as just a few examples. Operating software can also include proprietary, specialized, or custom operating system platforms to run on processing systems, such as Palm OS of PalmSource, Inc. for use on PDAs. Operating software provides security mechanisms for a platform to restrict an application software package from interfering with or damaging another application software package, the operating software, or the underlying hardware. While most computing device and processing system platforms include this type of distinction between application software and operating software, discussion in the following description will generally refer to a "user address space" or "user space," where application software typically resides; and "kernel address space" or "kernel space," where core operating system software typically resides. When an operating system loads on a computing device, it will define a kernel address space, and will allocate memory addresses for user processes, or define a user address space.

In the framework of the UNIX operating system and its variants, such as Apple's OS X, applications typically run in user address space while device drivers and some special services run in kernel address space. When an application executes, it typically executes with the full privileges of the user who initiated the execution. However, a typical application rarely needs every capability that a user possesses for it to operate. To provide security, an application may be "contained" by restricting its functionality to a subset of user operations and only allowing operations that are necessary for the proper operation—that is, operation according to its intended functionality.

FIG. 1 illustrates a Venn diagram of the capabilities of contained applications as a subset of a user's capabilities 100. In the absence of applications being contained in accordance with the methods disclosed herein, the capabilities of each application 102, 104, 106 would typically be the capabilities of the user. But, the user's capabilities 100 are typically a superset of possible operations (e.g., system calls) that any one of the applications 102, 104 and 106 may typically need to invoke during normal operation. For example, although the user may delete files in any directory where he has privileges, the mail application 102, when executed by the user, does not typically need the capability to delete files in the directory of the browser application 104. As another example, neither the browser application 104 nor the word processor application 106 may typically need to access the calendar database in the mail application 102, and should thus be restricted from doing so. In some examples, capabilities may overlap between applications. For example, both the mail application 102 and the browser application 104 may need to open a network port to communicate with an external network, such as the Internet. As another example, the word processor application 106 and the mail application 102 may share the same spell check dictionary, and so each application would need access to read and write to a dictionary file. One method to implement a limited set of policies for each user application is to contain, or "sandbox" the applications. In some preferred implementations of the present invention, sandboxing of an application or process can be achieved using operating system level protection to provide containment and to enforce security policies, such as policies that restrict the ability of the application to take actions beyond those functions needed for it to provide its intended functionalities.

Figure 2:
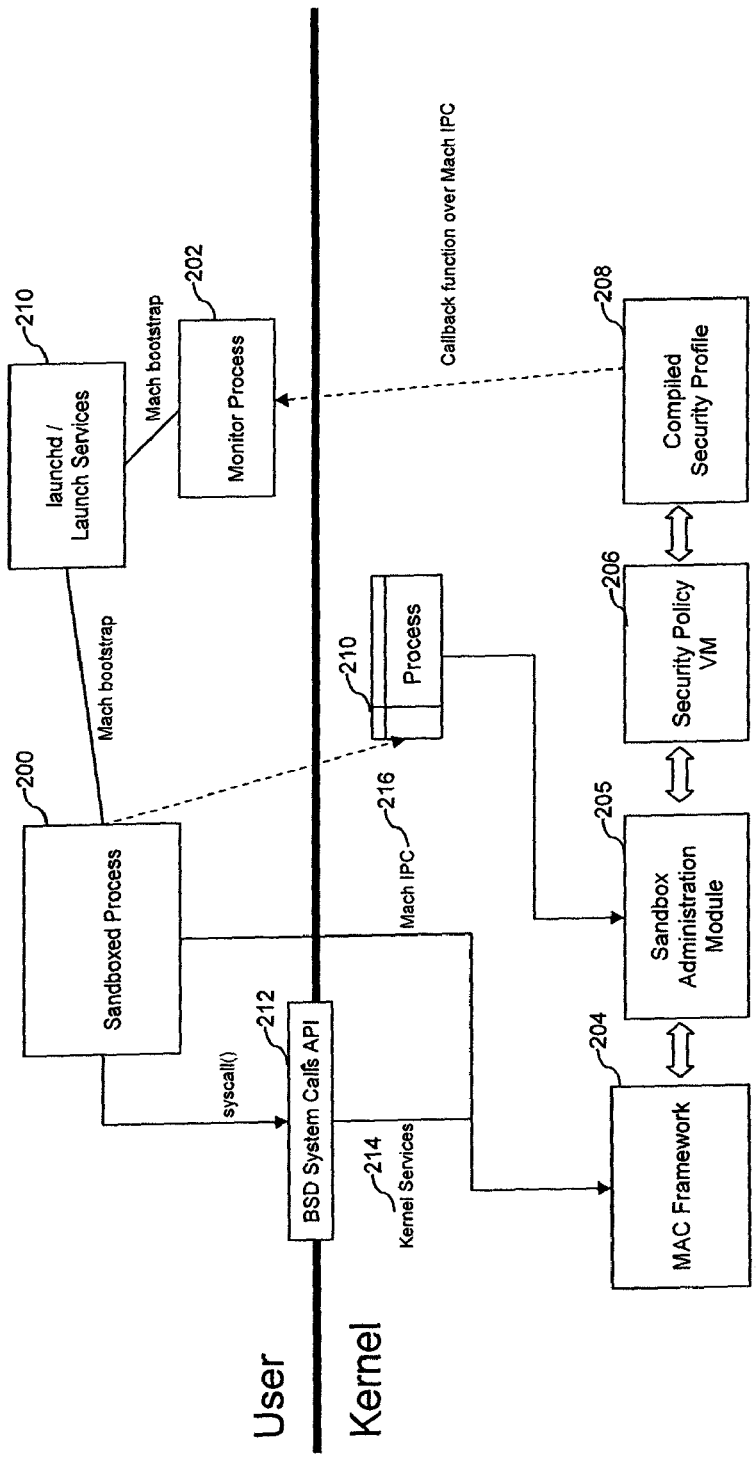
FIG. 2 illustrates a security system in accordance with an example embodiment of the invention, as implemented on a computing device, and particularly implemented at least in part by the OS of the computing device.

FIG. 2 illustrates a security system in accordance with an example embodiment of the invention, as implemented on a computing device, and particularly implemented at least in part by the OS of the computing device. Components illustrated include a sandboxed process 200, a monitor process module 202, a MAC framework 204, a sandbox administration module 205, a security policy virtual machine (VM) 206, a compiled security policy profile 208, a launchd/Launch Services module 210, and a BSD System Calls API 212.

Sandboxed process 200 is the application or other program for which security containment will be implemented. In many cases, the sandboxed process 200 will be a user application, but it could be another program implemented on the computing device such as a daemon or a service. To increase security and provide an efficient mechanism, portions of the security system are implemented or executed in kernel space. In addition, the monitor process module 202 is executed in separate memory space from the sandboxed process 200 to further insulate them from each other. In particular, in an embodiment, a sandboxed process 200 is restricted from accessing memory outside of its process space and is further prohibited from spawning a non-sandboxed process. For example, a compiled security profile 208 may include a rule or policy that denies a sandboxed process 200 from using the system call ptrace (2), which is the mechanism that allows processes to alter each others address spaces. The use of compiled security profiles 208 to permit or deny actions is described in further detail below.

Another operation performed by monitor process module 202 is providing a user interface to further protect an application from malicious events. For example, in many instances an application will seek to open a user interface, such as a dialog box, menu, or other user interface element, to receive user input. Such an interface could be an avenue for attack by malicious code. Where the application is a sandboxed process 200, any such user interface will be presented by the monitor process module 202 on behalf the application. In some implementations, the monitor process module 202 will adapt the user interface to appear as if it is originating from the sandboxed process 200, so that the action is transparent to a user.

In the embodiment of FIG. 2, the monitor process module 202 is configured to execute in user address space. However, in other embodiments, the monitor process module 202 may be configured to run, in part or in whole, in kernel address space. As illustrated in FIG. 2, the security system may implement a single monitor process module 202 such that a single monitor process exists for all applications. In other embodiments, two or more monitor process modules 202 may be configured to execute where each monitor process module 202 is associated with one or more applications (e.g., each application having a dedicated monitor process module 202) or monitor process modules 202 may be configured and assigned according the type or class of service. For example, sandboxed processes 200 may be grouped by the executing user in a multi-user environment, or sandboxed processes 200 that have substantially the same security configuration. For example, the use of a "Dashboard" and "Widgets" are known in the art, and are exemplified in the MAC OS X, "Tiger" operating system from Apple Computer, Inc. These widgets are small applications that can be of many configurations and capabilities. Widgets that can display objects on the screen and connect to a network can share a similar security configuration, whereas widgets that have fewer functions, such as only being able to display data on a screen, may be configured to use a different security profile to provide operational efficiency in sandboxing.

In the depicted embodiment, the sandbox administration module 205 performs basic administration of the operations relating to checking trapped kernel operations relative to the security profile. For example, it: traps kernel operations through MAC hooks triggered in the MAC framework 204, determines the relevant compiled security profiles, (in some cases) prepares the kernel data, and asks the security policy VM 206 to execute the appropriate portion of the compiled profile. The security policy VM 206 will then execute the relevant portions of the compiled security profile 208, and return a result to the sandbox administration module 205. The use of a virtual machine, as described, provides advantages in providing security of operations, by isolating the remainder of the kernel from the security operations as described herein. As is well understood, the instructions for a virtual machine will be compiled to a machine language other than one native to the hardware of the device.

Compiled security profiles 208 can include one or more policies, where a policy is a logical expression of a permissive or restrictive action that a sandboxed process 200 may or may not take. For example, one policy may expressly allow a mail application to open an email database. In such an example, all other actions may be impliedly denied. In some embodiments, a default policy is available in the compiled security profile 208, such that if none of the express permissive policies are applicable, then the default policy (typically denial of the operation) is applied. In various embodiments, compiled security profiles 208 are written in a high-level, human readable form, such as a procedural language or as a group of control statements. In selected embodiments, each compiled security profile 208 is associated with a respective sandboxed process 200. In further embodiments, a compiled security policy 208 is associated with more than one sandboxed process 200, such as when a system-wide or global security policy is implemented. In embodiments, individual profiles may be associated with distinct instances or instantiations of applications or daemons. For example, if a user executes more than one image of an application, each image may have a corresponding profile.

In some embodiments, when a compiled security profile 208 is initialized, it may register the hook functions it can handle and the sandboxed process it is associated with in a lookup table available to the sandbox administration module 205. In an embodiment, sandbox administration module 205 maintains one or more tables for each sandboxed process 200 that includes kernel operations and associated policies. In such an embodiment, when a MAC hook is trapped, the MAC framework 204 can call the sandboxed administration module 205. The sandbox administration module 205 can refer to the process table 210 to obtain process credentials or other information. The sandbox administration module 205 can also refer to the tables related to the originating sandboxed process 200, to determine a policy decision, as described in further detail below.

In one embodiment, the launchd/Launch Services module 210 is invoked when an application or daemon is executed. In embodiments, launchd is a daemon that provides a framework to start, stop, and manage other daemons, programs, and scripts. Typically, launchd is invoked during the system startup, or "boot", process and executes startup jobs. In an embodiment, when a request for a Mach bootstrap is detected by the launchd daemon, a privilege check is performed by querying the monitor process 202. Because a bootstrap request is not a system call, it is appropriate to trap it using the process that would grant the bootstrap information (e.g., launchd). Thus, launchd is capable of filtering bootstrap requests to allow only a subset of bootstrap addresses to be seen by an application or daemon, translating a bootstrap lookup to redirect messages, or use more complex rules to limit the duration, time of availability, or other aspect of access to a bootstrap address, in various embodiments. To enable this type of extended functionality, in some embodiments, launchd provides one or more hooks, which can be used by other programs or processes to make the permission determination.

Launch Services, the other portion of the launchd/Launch Services module 210, is invoked when a user executes, or "launches", an application or process. In an embodiment, Launch Services communicates with the monitor process 202 to indicate that system calls generated by an application or daemon during the initial stages of startup should be permitted. This may be necessary in some embodiments as the launched application or daemon may not have had an opportunity to compile and prepare a profile to express permitted actions. It is also consistent with the overall design of the security system that permits intentional user actions, where launching of the application or daemon can be viewed as an intentional user action.

In the depicted embodiment, upon execution of a sandboxed process 200, the kernel's session monitor (not shown) will bootstrap the necessary communication ports and load the security profile into the kernel. The security profile 208 and communication ports will be attached to the process 200 and copied to any child processes (e.g., copied across forks). In one implementation, the security profiles 208 may be associated with the sandboxed process 200 by being attached to the binary for the process. However, other alternatives of making the security profile available to be accessed in reference to the sandboxed process 200 may be utilized, such as using a database, an external file, or an extended attribute to store the associated security profile 208. In some embodiments, a security profile is compiled and loaded into the kernel when a sandboxed process executes and is unloaded when the last process that references the compiled profile terminates.

During operation, any interaction with the operating system's resources (e.g., ports, files, etc.) by a sandboxed process 200 will trigger one or more MAC hooks in the MAC framework 204. Interaction with the operating system's resource may be through the BSD System Calls API 212, which then executes one or more kernel services 214 (e.g., VFS, socket IPC, process signaling, or pipe IPC as discussed in FIG. 4), or through Mach IPC 216. Kernel operations in the kernel are then invoked by the kernel services 214, by Mach traps or by Mach IPC 216. Certain kernel operations may be trapped by MAC hooks, which are implemented at a functional level below the BSD System Calls API 212. The security policy VM 206 may be triggered by a MAC hook trap and may then execute a compiled security profile 208 to determine if the action is authorized.

In some cases, the compiled security profile 208 may be configured to delegate an authorization decision to the monitor process module 202, such as by using a callback function over Mach IPC. In an implementation, the sandbox administration module 205 and/or the security policy VM 206 (using the compiled security profile 208) can evaluate a kernel operation and determine a "permit" or "deny" resolution based on a security policy. When requests for authorization cannot be resolved to a clear "permit" or "deny" resolution, then such determination will be allocated to the monitor process module 202. For example, a process may need to regularly access one or more files. The paths and filenames of such files can be stored for quick access and authorization decisions. However, on occasion a user may wish to access another file, at which time the monitor process module 202 may be invoked to determine if the action is permissible.

Authorization requests may be deferred to the monitor process module 202 for a number of reasons, including the complexity of determination (it may be preferable to keep complex determinations outside of sensitive kernel code), a decision based on design policy (sometimes it may be preferable to allow a user or other user space application to provide the authorization decision), a system policy instructs that decision is to be referred to the monitor process module 202, or when a policy rule has not been provided at the kernel level. In selected embodiments, it is considered desirable to perform as many determinations as possible in the kernel. In such cases, the compiled security profile 208 may dictate that only kernel operations of certain types will be forwarded to the monitor process module 202 for resolution. For example, most operations might be resolved in the kernel except for operations requiring user input, such as identification of a filename, in which case the determination would be referred to monitor process 202. No action to complete an initiated system call or kernel command will be allowed until the sandbox administration module 205, security policy VM 206, and possibly the monitor process module 202 have determined that the implicated kernel operations should be permitted.

System Architecture

As noted above, to extend the inherent security model, some UNIX systems include a mandatory access control (MAC) framework. In general, the MAC framework provides a low-level security mechanism that implements configurable policies. In a typical operating system, a specific system call initiated in user space and implemented using an API generates one or more kernel operations, where each kernel operation represents a low-level, atomic or fundamental action within the kernel to perform a specialized function. The MAC framework is based on kernel operation interception or kernel operation interposition such that when a kernel operation generated from a system call is detected, the MAC framework may permit or deny the requested action based on one or more policies. In other implementations, the MAC framework may allow for increasing or decreasing privileges during a system call, changing or substituting a path or filename, or otherwise modifying a kernel operation or system call before allowing it to execute.

Figure 3:
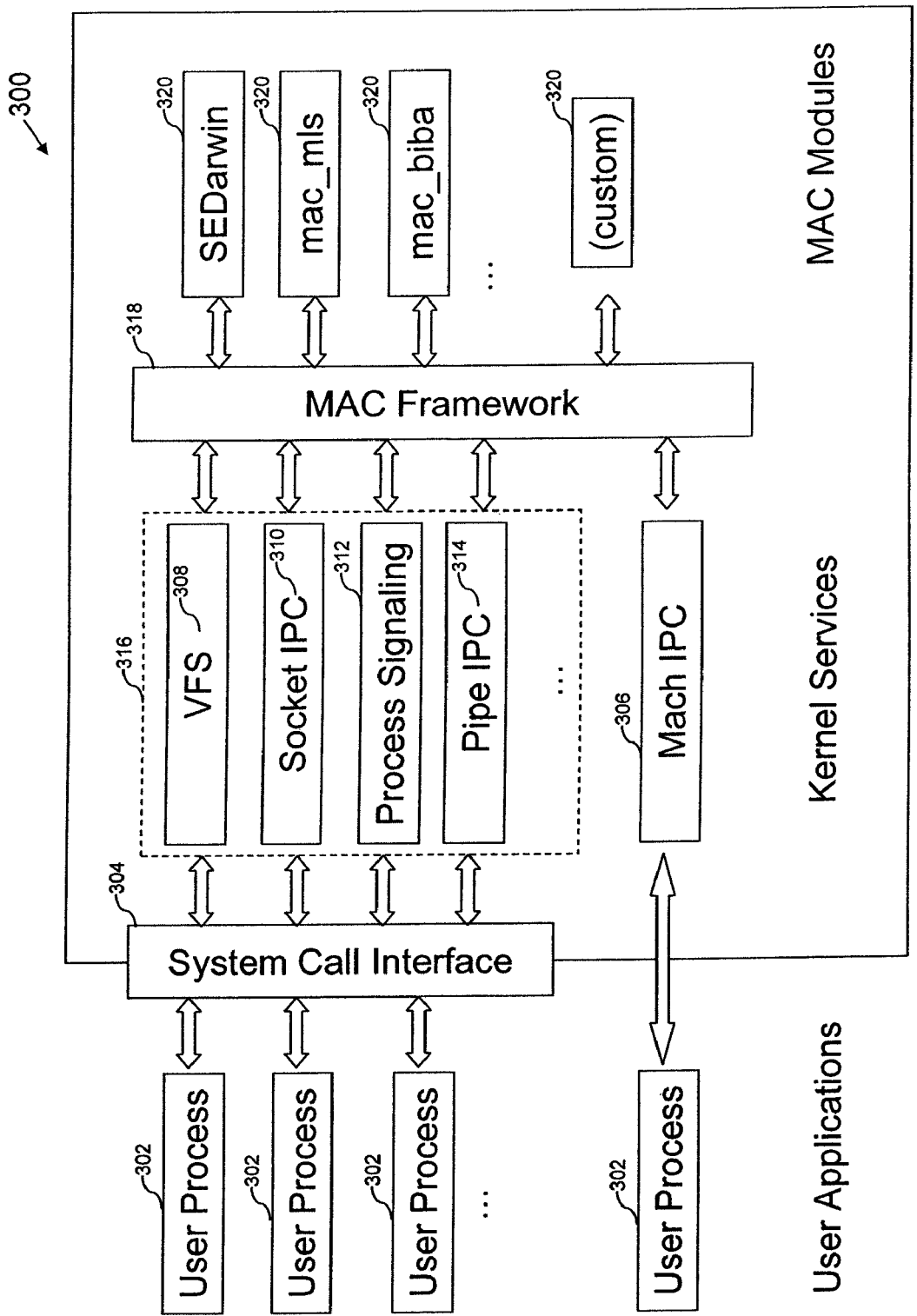
FIG. 3 illustrates a MAC framework security system architecture in accordance with an example embodiment.

FIG. 3 illustrates a MAC framework security system architecture 300 in accordance with an example embodiment. In an embodiment, a hybrid kernel is implemented and includes a BSD kernel component and a Mach kernel component. In such an embodiment, user processes 302 may communicate with the BSD kernel's system call interface 304. Alternatively, user processes 302 may also communicate with the Mach kernel using Mach IPC 306. When a system command is issued through a system call invoking the system call interface 304, one or more sub-systems, which when combined form a set of kernel services 316, are implemented to execute the system command. Sub-systems may include, for example, VFS 308, socket IPC 310, process signaling 312,or pipe IPC 314. Kernel operations at the sub-system layer trigger the MAC framework 318 and through the use of hooks, one or more MAC modules 320 can analyze the kernel operation and either permit or deny the corresponding action. MAC modules 320 include, for example, SEDarwin, mac_mls, mac_biba, or other custom or proprietary modules developed to run within the MAC framework 318.

System Detail

Two principle use cases exist which will be described with reference to FIG. 4. The first use case is when a sandboxed application or daemon generates a system call. Typically, when an application or daemon generates a system call, it is as a startup, background, or other automated routine for process or application maintenance. For example, when an email program is executed, it may need to open a mail database file, bind to a port to send and receive email, or allocate virtual memory. When the email program is operating, background or automated tasks, such as checking for new mail or archiving old emails, are executed and may use additional system calls. These fundamental and essential tasks correspond to the nature and purpose of the particular process or application (e.g., an email program). However, in some instances, an application or daemon may attempt to execute an unauthorized system call, such as when a computer virus, Trojan, or worm takes control of a user application or daemon. Malicious computer programs such as these seek to bypass security measures by spoofing legitimate application or daemon system calls.

The second use case is when a user initiates an action or command. In the context of an email program, the user may open emails, compose new emails, or delete existing emails using a user interface. In a graphical user interface, some user actions or commands are implemented using a dialog box or other child window. For example, when a user selects "Save As" from a File menu, a dialog box is presented to obtain a target directory and filename. Malicious programs, such as those described above, may attempt to intervene and modify a user's input before the command is executed or emulate an entire user command. While many user commands are typical and ordinary within the context of an application and may warrant minimal attention from a security system, some extraordinary or atypical commands should be analyzed to determine if it was the user that initiated the command based on a particular desire or a malicious program attempting to impersonate the user.

Figure 4:
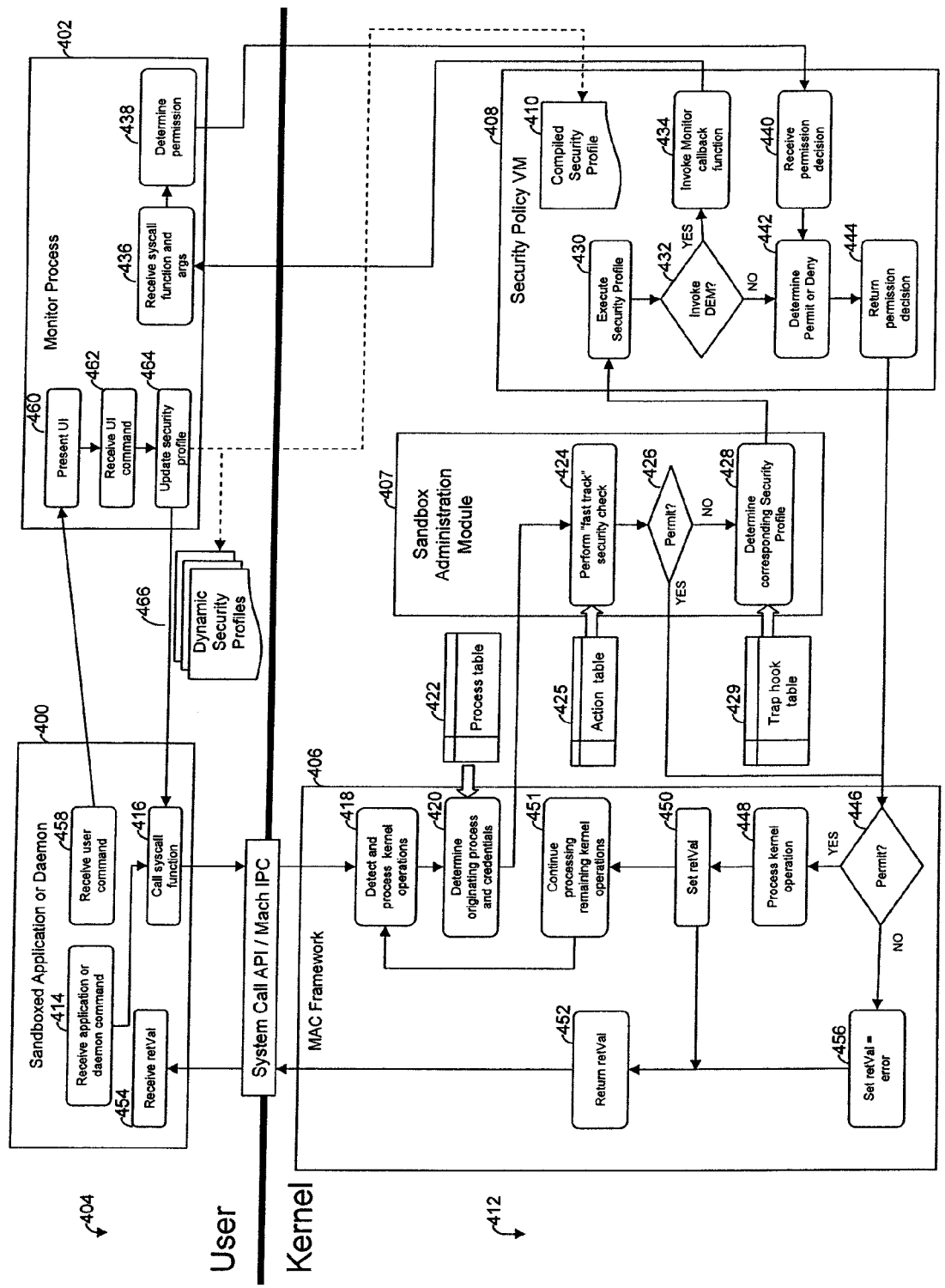
FIG. 4 illustrates a functional diagram for a security system as depicted in FIG. 3.

FIG. 4 illustrates a functional diagram for a security system as depicted in FIG. 3. The security system includes a sandboxed application or daemon 400 and a monitor process module 402, each running in a user address space 404. The security system further includes a MAC framework module 406, a sandbox administration module 407, a security policy virtual machine (VM) 408, and a compiled security profile 410, which run in kernel address space 412.

In an embodiment, each sandboxed application or daemon 400 is associated with a corresponding compiled security profile 410. When an application or daemon 400 is executed, a profile is determined and compiled into kernel space 412. As noted earlier herein, the application or daemon's profile may be included in the binary (e.g., in a signed application), may be attached as an extended attribute, may be available in a separate database or file, or may be inherited from the parent process, in various embodiments. For example, when an application or daemon executes, during initialization the application or daemon can determine its corresponding profile and compile and load it into kernel space 412. In one embodiment, a sandboxed application or daemon 400 is aware of the security system and calls a provided API to pass a copy of the profile to the kernel. The kernel, in turn, sends the profile to a special user space process where the profile is compiled and loaded into kernel space. In another embodiment, a profile may exist as an extended attribute for a binary and when hooking exec ( ) or execve ( ) calls in the MAC framework module 406, the kernel can look at the binary to see if that extended attribute exists. If so, the kernel can extract the extended attribute, send it to a special user space process to verify its form or completeness, compile it, and load it into the security system for use by later system calls originated by the binary. In some embodiments, a different compiled security profile 410 is associated with each instance of a corresponding sandboxed application or daemon 400; and/or a separate security policy VM 408 may be provided for each active application or daemon 400. In another embodiment, a single security policy VM 408 is provided to service two or more sandboxed applications or daemons 400. For clarity of illustration, one security policy VM 408 and one compiled security policy profile 410 will be discussed in reference to FIG. 4.

In the context of the first use case, when an application or daemon 400 generates a command, at block 414, the command is received. As discussed above, the command is typically initiated by a legitimate process request, such as to open a file, bind to a port, or create a network socket. In response to the command, a system call is executed or initiated 416 by the sandboxed application or daemon 400. The executed or initiated system call can be communicated either through the BSD system call API layer (e.g., FIG. 3 at 304) or via a Mach message (e.g., FIG. 3 at 306) into the kernel.

At block 418, one or more kernel operations are detected and processed by the MAC framework 406. As discussed above, the MAC framework 406 includes hooks associated with system calls at various levels within the kernel, such as at the kernel operation level. The MAC framework 406 can trap kernel operations, trigger an associated hook function, and optionally process arguments resulting from the system calls such that the originating process and its credentials are available to the associated hook function. At this point, the MAC framework 406 suspends any further processing related to the kernel operation until an authorization decision is returned.

At block 420, the originating process and process credentials are determined. In the depicted embodiment, the process and process credentials are obtained from one or more process tables 422, which may be stored and maintained in kernel space 412.

At block 424, a "fast track" security check is performed. In an embodiment, simple rules or policies are reduced to a lookup table 425, which the sandbox administrative module 407 can reference to make quick policy decisions. For example, a simple rule of always allowing network access to a browser application can be stored in a lookup table 425. Thus, when a system call or kernel operation that attempts to open a network socket is trapped in the MAC framework 406 and passed to the sandbox administrative module 407 for evaluation, the sandbox administrative module 407can quickly determine that it is an allowed action and return control to the MAC framework 406 for further processing. A similar process can be used to quickly determine if a kernel operation is always denied permission to execute. Thus, the fast track security check may result in one of three states: permit, deny, or invoke security policy VM 408.

Figure 5:
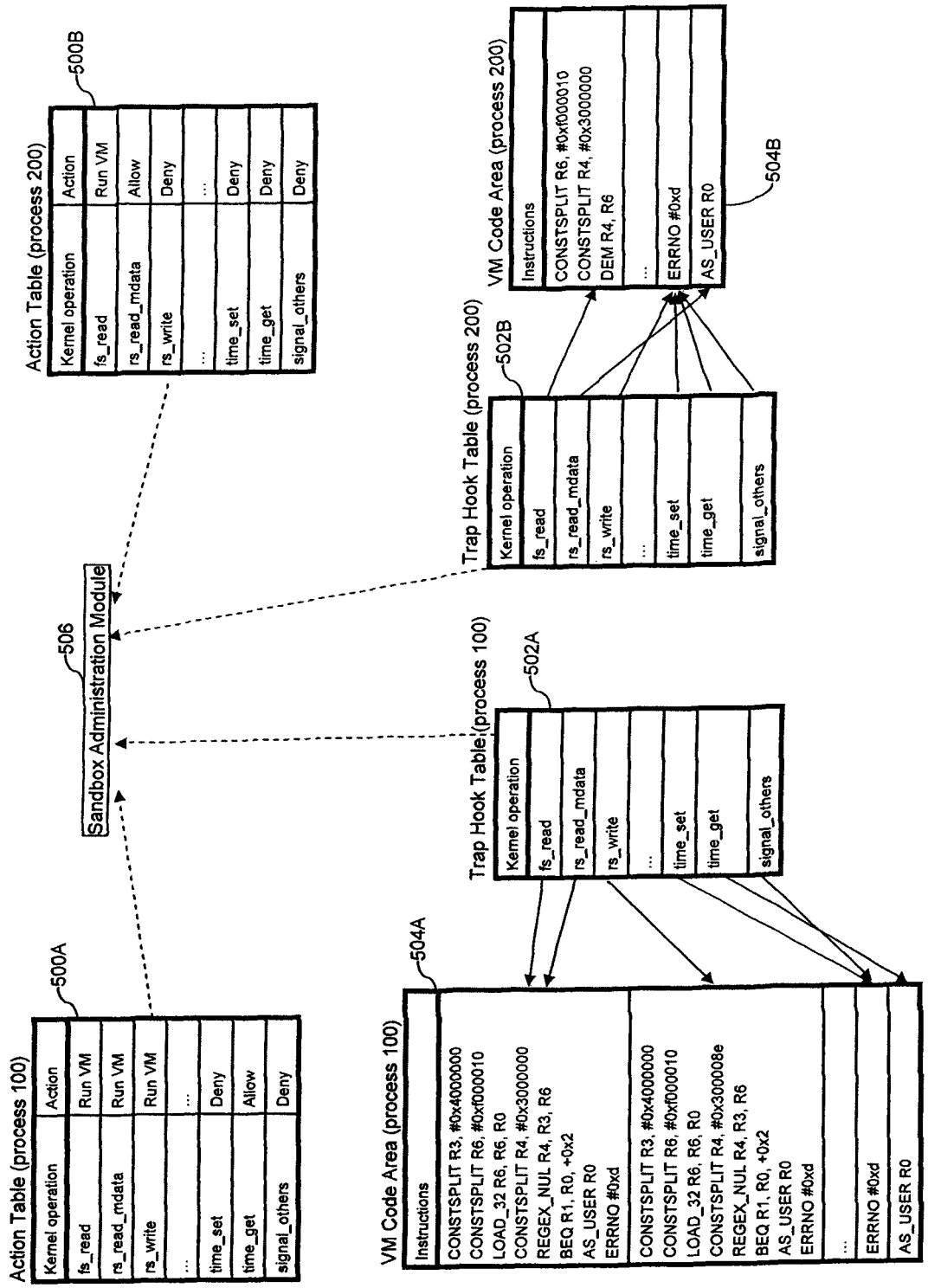
FIG. 5 is a schematic diagram of processes' lookup tables and corresponding compiled security profiles, in accordance with an example embodiment.

Referring now also to FIG. 5, depicted therein is a schematic diagram of processes' lookup tables and corresponding compiled security profiles, in accordance with an example embodiment. In this illustrated embodiment, tables for processes with ID's 100 and 200 are shown. Each process is associated with an action table 500A, 500B, a trap hook table 502A, 502B, and a VM code area 504A, 504B. When a security profile is compiled and loaded into kernel space, it can register the relevant MAC hooks in a trap hook table 502A, 502B. The trap hook table 502A, 502B is stored and maintained in kernel space to provide additional security for data integrity. When the sandbox administration module 506 executes, it first references the action table 500A, 500B for the originating process. Based on the operative kernel operation, the sandbox administration module 506 can make a quick determination whether the kernel operation's action is always allowed, always denied, or can invoke the security policy VM to make a more complex decision. For example, referring to process 100's action table 500A, a kernel operation of "time_set" is always denied, whereas a kernel operation of "time_get" is always allowed. Other kernel operations, such as "fs_read" and "fs_write" direct the sandbox administration module 506 to invoke the security policy VM.

If the sandbox administration module 506 is directed to invoke the security policy VM, the process' trap hook table 502A is referenced to determine the corresponding code in the VM code area 504A. Using the code, the security policy VM can determine a policy decision.

Referring once again to FIG. 4, at block 426, if the fast track determination resulted in an "always permit" or "always deny" resolution, then control passes back to the MAC framework 406 to block 446. Otherwise, control passes to block 428 for further analysis.

At block 428, one or more corresponding compiled security profiles 410 are determined. In an embodiment, a trap hook table 429 is maintained to track profiles and corresponding processes (e.g., sandboxed application or daemon 400). Using the process ID or other process context information, any corresponding profiles for application or daemon 400 are identified in the lookup table. In one embodiment, a process may be associated with both a global or system-wide profile and an application-specific profile. When multiple policies exist for a process, the sandbox administration module 407 may execute them in an arbitrary order or in an ordered manner, such as by least complex to most complex (as measured by size), a queuing mechanism (first-in-first-out), by policy scope, or otherwise. Implementing multiple policies may provide advantages such as controlling policies at a macro or micro level or increasing operational efficiencies by processing less complex policies first.

At block 430, a policy in compiled security profile 410 is executed on the security policy VM 408. In an embodiment, the compiled security profile 410 is written using a high-level language and compiled to a machine code to operate on the security policy VM 408. A compiled security profile 410 may include one or more logical constructs, which may be represented as a combination of a command, a conditional element, and a permission decision. In an embodiment, the permission decisions include "permit" (or "allow"), "deny", and "defer", where deferring the decision may invoke another layer of the security mechanism. In some embodiments, complex decision control or conditional statements are supported by the high-level security profile language.

At block 432, whether to invoke a decision extension mechanism is determined. In an embodiment, the decision extension mechanism includes an inter-process communication method (e.g., Mach IPC or L4 IPC) and an authorization module (e.g., monitor process 402) that exists in the user address space 404. To extend decision control outside of the kernel may be advantageous for several reasons including allowing users to interact with the decision control process, providing an additional layer of authoritative checking, and moving complex decisions outside of the kernel and its sensitive operating code where programmatic mistakes may affect the entire operating system environment.

At block 434, if the DEM is to be invoked, then the arguments to the corresponding kernel operation are bundled into a remote procedure call ("RPC") and sent to user address space 404 for further evaluation. In an embodiment, Mach IPC provides for RPC. The Mach kernel uses a generalized inter-process communication ("IPC") to allow communication of practically any data type between programs or processes. The destination of the RPC is determined by a callback function. In some embodiments, when an application or daemon is executed in user space, its parent, usually a process being run as a kernel application, may register a callback function (e.g., add a function to a callback table in the kernel), such that when the compiled security profile 410 is directed to defer a permission decision to user space, the compiled security profile 410 can refer to the callback table and make a RPC to the function found in the table, which will handle the permission authorization request.

At block 436, the callback function in the monitor process 402 receives the bundled kernel operation. The bundled kernel operation is unpacked into its constituent components.

At block 438, the monitor process 402 determines an authorization decision. In some embodiments, the authorization decision is silent, in that it does not involve querying the user via dialog boxes or alerts. In other embodiments, the authorization decision may include user interaction using one or more graphical user interface elements, such as a dialog box, a confirmation dialog, or the like. The callback function may perform one or more actions, such as sanity checking the arguments of the kernel operation (e.g., checking whether a proffered argument is within a reasonable upper or lower boundary), and replying to the compiled security profile 410 with a policy decision.

At block 440, the compiled security profile 410 receives an authorization decision from the monitor process. In an embodiment, the monitor process represents the lowest layer of authorization and the only permission decisions allowed from the callback function are permit or deny.

At block 442, the permission decision is determined. If at block 432 the DEM was not invoked, then a decision was obtained using alternative logical routes in the compiled security profile 410. Such a decision must resolve to either "permit" or "deny", as in this embodiment, ambiguous policy decisions are resolved at the user level using the monitor process 402. In other embodiments, it may be possible to resolve all, or at least more, authorization decisions within the security VM 412

At block 444, the permission decision is returned to the security policy VM 408, which passes it through to the MAC framework 406. In an embodiment as discussed relative to FIG. 6, if more than one compiled security profile 410 is executed, the security policy VM 408 may inspect each permission decision and only interrupt further profile processing if a "deny" is received. For example, when a kernel operation is trapped by the security policy VM 408 and there are three corresponding compiled security profiles 410, if the execution of the first security profile 410 returns a "deny" permission decision, then the other two security profiles 410 are not executed and the security policy VM 408 returns the deny permission decision to the MAC framework 406. However, if the first security profile 410 returns a "permit" permission decision, then subsequent security profiles 410 are executed.

At block 446, the MAC framework 406 determines whether the permission decision was "permit" or "deny." If permission was granted, then at block 448 the kernel operation is processed. In an embodiment, the compiled security profile 410 or the monitor process 402 may alter one or more arguments of the system call. For example, a user may be granted less permission or, in a rare case, the user may be granted more permission for the purpose of the kernel operation. In such an event, the kernel operation is processed with the altered arguments at block 448.

In an embodiment, when a file is opened for reading and writing, the monitor process 402, compiled security profile 410, or security policy VM 408 may alter the target file's location, such that the user may save data to a file, but the file will be created for the user and kept separate from any shared data. For example, if a user attempts to modify a dictionary file in a shared computing environment where the unmodified dictionary file is used by several users or several applications, the user's modifications are written to a "local copy" of the dictionary file (e.g., in the user's directory). In some embodiments, the user may not be made aware of the redirection and may continue to use and modify the file (e.g., a dictionary file) with the application that accesses the file being remapped to open and modify the file from the new location. A security system, such as the one described, provides such path substitution and transparency to the user. In an embodiment, the application need not be aware of the substitution and the components of the security system (e.g., the monitor process 402, compiled security profiles 410, or security policy VM 408) may store the path substitution and provide the correct modified path on every file access request, thus providing transparency to the user and to user applications.

At block 450, the results of the kernel operation are detected. The return value ("retVal") is set to an appropriate value to indicate the results of the kernel operation. For example, while a kernel operation may be authorized and permitted by the MAC framework 406, security policy VM 408, compiled security profile 410, or monitor process 402, another error may occur during the execution of the kernel operation (e.g., lack of disk space) that would set retVal to a value indicating an unsuccessful command.

At block 451, any remaining kernel operations related to the called system call are processed by proceeding to block 418 and continuing. If there are no more kernel operations to process, the a retVal is returned at block 450 indicating a success.

At block 452, the return value ("retVal") is sent to the sandboxed application or daemon 400. If at block 446 the permission decision was "deny", then the retVal is set to an appropriate value at block 454 and returned to the sandboxed application or daemon 400 at block 452.

At block 456, the application or daemon 400 receives the result of the kernel operation in the form of a return value. The sandboxed application or daemon 400 may provide an indication of the success or failure to a user, write the indication to a log, or otherwise act on the success or failure in subsequent processing.

In the context of the second use case, when user initiates an action or command, at block 458, a user command is received. Instead of processing the command using the sandboxed application or daemon 400, control is passed to the monitor process 402. Using such a configuration may advantageously provide increased security through the use of separate address spaces in the user address space 404.

At block 460, a user interface is presented by the monitor process 402. For example, if a user issues a command to attach a file to an email message, then the monitor can present the dialog box to choose the target directory and filename. In an embodiment, the dialog box is generated to visually appear as if it was part of the sandboxed application or daemon 400. For example, similar window borders, colors, fonts, or other presentation details may be emulated by the monitor process 402 to maintain a consistent user experience. Presenting the user interface dialog box in the monitor process' address space provides additional security against malicious code that may exist in the application's or daemon's address space.

At block 462, the user's response is received. Continuing with the example from above, the target filename and path are received by the monitor process.

At block 464, a corresponding security profile is updated. In an embodiment, if the user's action would have been permitted by native UNIX permissions or by one or more compiled security profiles, then an update may not be necessary. In some embodiments, the security profile may include a dynamic security profile 466, which may be stored in user address space 404. In some embodiments, the dynamic security profile 466 is session-based, where it will be destroyed when a user logs out, or instance-based, where it will be destroyed when the user exits the corresponding application. In some embodiments, the dynamic profile may be stored and maintained over a longer period, which may be controlled by a user or administrator. For example, configuring dynamic profile permission rules to expire after 60 days may strike a balance between user convenience and system security. As another example, a most-recently used (MRU) list is maintained, for example, to store and maintain the last 50 files added to a dynamic security profile 466. In some embodiments, the dynamic security profile 466 may be regularly or periodically compiled into a new compiled security profile 410 or combined with an existing compiled security profile 410 for the corresponding sandboxed application or daemon 400. In some embodiments, the updates are rolled up into the compiled security profile 410 immediately after, or nearly immediately after, an update is made. In one embodiment, the user may choose to execute the sandboxed application or daemon 400 in a "learning mode" where during learning mode, the application or daemon 400 captures user actions as policy decisions in a dynamic security profile 466 and upon exiting or terminating learning mode, the policy decisions are compiled into a new compiled security profile 410 or combined with an existing compiled security profile 410.

In embodiments, each image or instance of an application or daemon may have a corresponding dynamic profile. Dynamic profiles may be kept distinct, such that access privileges granted in one image and captured in one dynamic profile are not known or automatically inherited in the other dynamic profiles for the same application, but which are associated with different instances. In a further embodiment, dynamic profiles are not copied from a running instance to a new instance of a sandboxed process. For example, if a user executes a first image of an application, performs actions which update the dynamic profile, and then execute a second image of the application, the first image's dynamic profile is not copied (e.g., used as a baseline) for the security profile of the second image.

In one embodiment, in addition to or in lieu of updating a dynamic security profile 466, the monitor process 402 can set a flag or otherwise tag an event to indicate that it was initiated by a user action as a result of user intent. In such an embodiment, one or more tables or programming modules in the operating system code may be updated to store and propagate the additional event information. The kernel operation may then update a table in kernel address space 412 so that other kernel operations or processes may refer to the table and determine whether the system call was initiated by an intentional user action.

At block 416, the system call is executed using the parameters obtained by the monitor process 402. Similar to that described above, the security policy VM 408 traps relevant hooks from the MAC framework 406 and executes one or more compiled security profiles 410 to analyze permissions. If the code in a compiled security profile 410 defers a permission decision to the monitor process 402 via DEM, than at block 438, the monitor process may query the dynamic security profile 466 to obtain a permission decision. If the user interacted with the monitor process 402 to issue the system call, then the dynamic security profile 466 has been updated to reflect that the system call is a user command that should be permitted. Permission for the system call is granted and further processing may occur in the security policy VM 408 or the MAC framework 406. In the case where the compiled security profile 410 is updated after a user command is received by the monitor process 402, then the compiled security profile 410 would not need to defer the decision to user space 404 and a permission decision of "permit" would be established at block 442. In some embodiments, when the compiled security profile 410 passes control back to the monitor process 402 in user space 405, the monitor process 402 can provide a verification to a user (e.g., a dialog box) to ensure that the user meant to perform the action in question. In selected embodiments, most policies are resolved in the kernel, and only limited decisions, such as those needing user input (such as, for example, of a file name) are referred to the monitor process 202. In such selected embodiments, over 50%, and even over 90% of policy permissions may be resolved in the kernel. These implementations avoid the delays inherent in crossing over the kernel-user space boundary, offering substantial speed efficiencies in the policy determinations, and improving the user experience for the contained process. In an embodiment, the interactive verification may be controlled using a program setting or other configuration by the user or another user (e.g., an administrative user). In further embodiments, a user may be prohibited from performing an action by the monitor process 402, even though the user input the command via the monitor process 402 and the resulting system call-initiated kernel operations passed through the internal kernel security checks (e.g., the security policy VM 408 and the compiled security profile 410). In some cases, preventing the user from executing an action that they initiated may be an executive policy by design, in order to protect the user from himself.

Policy Language

As described above, in an embodiment, the compiled security profile 410 is written using one or more high-level languages and compiled to a machine code to operate on the security policy VM 408. Examples of various language models are provided for illustration. Actual languages used in an implementation of the invention may include more or fewer features than described.

Example 1: one of the simplest forms of a policy is expressed with a process or operation name and a policy or permission decision. In this example, when a user wishes to obtain the real user ID of the current process, he may issue a getuid command. In an uncompiled security profile, the following high-level language statement may appear to enable such a command: "native-getpid: permit".

Example 2: another policy may be expressed using a comparison to a string or another value. In this example, a command is written to restrict a user from reading any file other than the specified one, "/etc/spwd.db" when the user issues a file read command, such as the fsread command. In the syntax of an exemplary high-level language, the command may look like: "native-fsread: filename eq "/etc/spwd.db" then permit".

Example 3: other high-level languages may provide support for advanced comparisons, including regular expression string matching. For example, directory paths and filenames or IP addresses represented as strings could be compared using regular expressions in a high-level language expression. For example, the regular expression conditional statement below checks a path argument of a system call.

```
fswrite(char *fname) {
    if (fname =~
m{^(/Users/(?!\.\.>)[^/]+/Library/Preferences/(cf#[^/]+|(com.apple.
dashboard.plist)|widget-
com.apple.widget.weather.plist)|/tmp/objc__sharing__ppc__\d+|/Users/[^
/]__Library/Caches/DashboardClient/((?!\.\.>).|\.[^./])*|/Library/
Caches/com.apple.IntlDataCache\.\d+)$})
        as__user;
    errno EACCESS;
```

In an embodiment, regular expressions are reduced to a finite state machine or deterministic finite automaton ("DFA") during compilation of the security profile. A DFA is generally described as a finite state machine where for each pair of a state and an input symbol, there is one and only one transition to a next state. In an embodiment, the DFA includes two or more end states. When a situation exists where multiple strings are similar in structure, such as when two strings describe a similar directory path but to different files, it may be advantageous to perform a minimal number of comparisons before determining an appropriate action. For example, the DFA discussed below in reference to FIG. 6 can be used to parse three similar file paths and when an end state is reached, an action, such as opening, reading, or deleting the file may be executed on the parsed file. In this example, the files "/etc/ntp.conf", "/etc/ntp.keys", and "/etc/ntp.drift" are of particular interest. If the file passed to the system call is "ntp.conf" or "ntp.keys", then one action is taken, such as opening for read.

Figure 6:
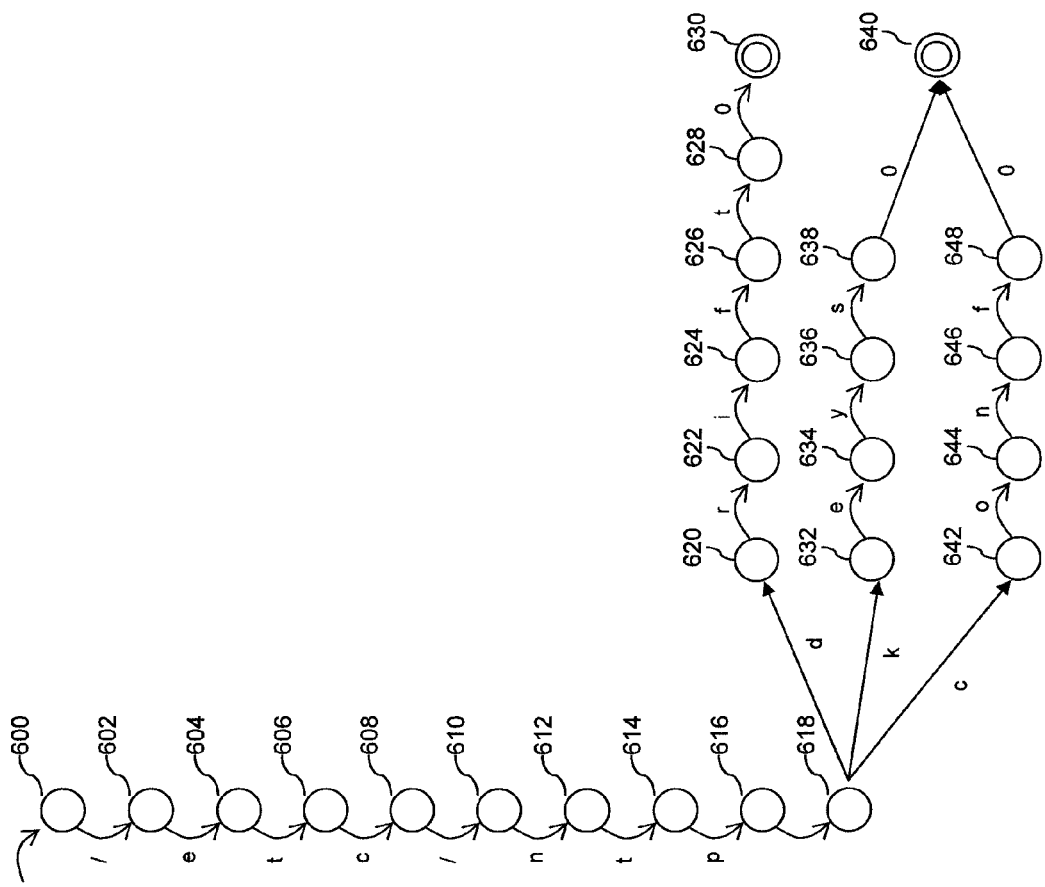
FIG. 6 illustrates a state diagram of a deterministic finite automaton, in accordance with an example embodiment.

If the file is "ntp.drift", then a second action is taken, such as opening for write. In one embodiment, the regular expression is reduced to a DFA and is represented as one or more tables that the compiled security profile can use to parse string arguments. Referring to FIG. 6, a few steps are explained to illustrate the DFA state diagram, the remaining steps can be inferred from the structure of the DFA state diagram. The state diagram begins at the start state 600. Analyzing each character in the string argument allows progression through the state machine. If a character does not match and the DFA cannot proceed to an accepted state, then the comparison fails and the compiled security policy may return an error code. However, as long as characters allow the DFA to proceed to continued accepted states, then the comparison is still valid. For example, following the characters in the string "/etc/ntp.keys", the DFA would begin at the start state 600 and proceed along each transition, making an evaluation against the corresponding character in the string, to the states 602, 604, 606, etc., until reaching the end states 630, 640, at which point the compiled security profile can accurately and confidently invoke an appropriate action (e.g., a function call or assigning a system permission). One significant feature in some embodiments is that DFA's are used which may branch to resolve to multiple states, as depicted at 630, 640; and these end states may represent different actions. For example, end state 630 may be "allow a write and allow a read" while end state 640 may be "allow a read, but deny a write". This configuration of branching DFA's avoids needless repetition of comparisons, thereby significantly improving the speed to resolution. While the depicted DFA represents a relatively simple decision, those skilled in the art will recognize that DFA's may be provided to resolve complex or lengthy comparisons. Thus, it should be understood that the DFA of FIG. 6 is an example only, and that DFA's may advantageously be used which may contain many branches and sub-branches, and which are therefore significantly more complex than the example used herein for illustration. The use of DFA's in selected embodiments of the present invention facilitates resolution of policies relative to kernel operations resulting from system calls with a speed which does not adversely impact the user experience of one utilizing a device implementing the embodiment. DFA's in other embodiments may be designed to parse POSIX shared memory segment labels, network addresses, or management information base (MIB) styled names, such as an object ID (OID) used by sysctl to identify a system object.

Example 4: still other high-level languages may provide support for C-like control structures including conditional statements such as "if-else" blocks, nested function calls, global variables within the compiled security profiles, include files, and the like. An example of a more complex policy written in a C-like policy description language follows:

```
socket(int domain, int type, int proto) {
    if (domain == AF_INET &&
        ((type == SOCK_DGRAM && proto == IPPROTO_IP) ||
         (type == SOCK_DGRAM && proto == IPPROTO_TCP))) {
        ipfw(ALLOW,
            "apple.accuweather.com",
            "com.apple.widget.weather");
        ipfw(DENY,
            ALL,
            "com.apple.widget.weather")
        mark_socket(com.apple.widget.weather)
        as_user;
    } else if (domain == AF_SNA) {
        as_user;
```

```
    }
    errno EACCESS;
}
```

This function, which may be run when a socket( ) system call is trapped, for example by the MAC framework 406, checks the arguments of the system call (domain, type, and proto) and only permits a domain designated as "AF_INET", which corresponds to the Internet domain; a socket type of "SOCK_DGRAM", which is a datagram socket; and a protocol of either "IPPROTO_IP" or "IPPROTO_TCP", which correspond with the IPv4 protocol and the TCP protocol respectively. When the socket ( ) system call arrives with the these arguments, then the operation ipfw is called to direct a firewall daemon to allow all traffic to "apple.accuweather.com" from the application "com.apple.widget.weather" along with a second operation call to deny all other traffic. The socket ( ) system call is then allowed to run to its completion as the current user, as indicated by the directive "as_user".

Example 5: another example of a high-level language includes statements that define a policy or rule, such as may be similar to statements used to configure a firewall. In an embodiment, such policies or rules have the following syntax:

OPERATION [, OPERATION ...]: ACTION [if FILTER [&& FILTER... | || FILTER...]];

where OPERATION is a class of activities to be controlled; ACTION is a resulting operation; and FILTER is a conditional statement embodying the rule or policy. For example, OPERATION may include kernel operations such as fs_read_data, signal_self, parentage_fork, and net_outbound; ACTION may include allow, deny, or DEM (to invoke the decision extension module); and FILTER may include regular expressions or other comparisons and may be combined into complex filters using logical connectors, such as && or ||. Regular expressions ("regexes") can be enclosed by "m{" and "}". An example of a policy for the ntpd daemon is listed below.

```
# allow parent process actions
parentage: allow;
# deny signals
signal: deny;
# allow read only actions
sysctl_ro: allow;
# bind only to the ntp port
net: allow if IPv4 UDP from *:123 to *:*;
fs_read_mdata: allow;
# The current time zone could be anywhere in here!
fs_read_data: allow if m{^/usr/share/zoneinfo/};
Allow reading system dylibs and frameworks
fs_read_data,
fs_read_mdata: allow if m{^/usr/lib/.*\.dylib$};
fs_read_data,
fs_read_mdata: allow if m{^/System/};
Allow files accessed by system dylibs and frameworks
fs_read_mdata: allow if m{^/(var|tmp|etc)$};
fs_read_data,
fs_write_data: allow if m{^/dev/null$};
fs_read_data,
fs_write_data: allow if m{^(/private)?/var/run/syslog$};
fs_read_data,
fs_read_mdata: allow if m{^/dev/urandom$};
fs_read_data,
```

-continued

```
fs_read_mdata: allow if m{/.CFUserTextEncoding$};
fs_read_data,
fs_read_mdata: allow if m{^(/private)?/etc/localtime$};
fs_read_data,
fs_read_mdata: allow if m{^/usr/share/zoneinfo/UTC$};
fs_read_data,
fs_read_mdata: allow if m{^/usr/share/zoneinfo/posixrules$};
Allow NTP specific files
fs_read_data,
fs_read_mdata: allow if m{^(/private)?/etc/ntp\.(conf|keys)$};
fs_read_data,
fs_read_mdata,
fs_write_data: allow if m{^(/private)?/var/db/ntp.drift$};
fs_write,
fs_read_data,
fs_read_mdata,
fs_write_data: allow if m{^(/private)?/var/run/ntpd.pid$};
sysctl_info: allow;
time_set: allow;
```

In an embodiment, compiling such a profile involves three steps. First, simple rules are parsed out into a lookup table. Simple rules are those that either allow or deny an operation unilaterally such as "sysctl_ro: allow;". Second, regular expressions are extracted and built into one or more tables as DFA's. Third, conditional rules are compiled into machine code to run on the security policy VM. The lookup table can be used to quickly decide whether to continue the authorization decision process, while the machine code can be executed on the VM to perform more complex decision making.

In this illustrated embodiment, a general rule may obviate a more specific rule in the profile. For example, the general rule "fs_read_mdata: allow;" allows the kernel operation to always proceed. Thus, the more specific rules, suchas"fs_read_mdata: allow if m{^/usr/lib/.*\.dylib$};" are,in effect, ignored because the "fast track" decision to always permit this action based on the general rule will never allow the more specific rule to be evaluated. However, in this case, the specific rule for "fs_read_mdata" is coupled with another operation "fs_read_data", which will be evaluated because there is no general overriding rule.

Figure 7:
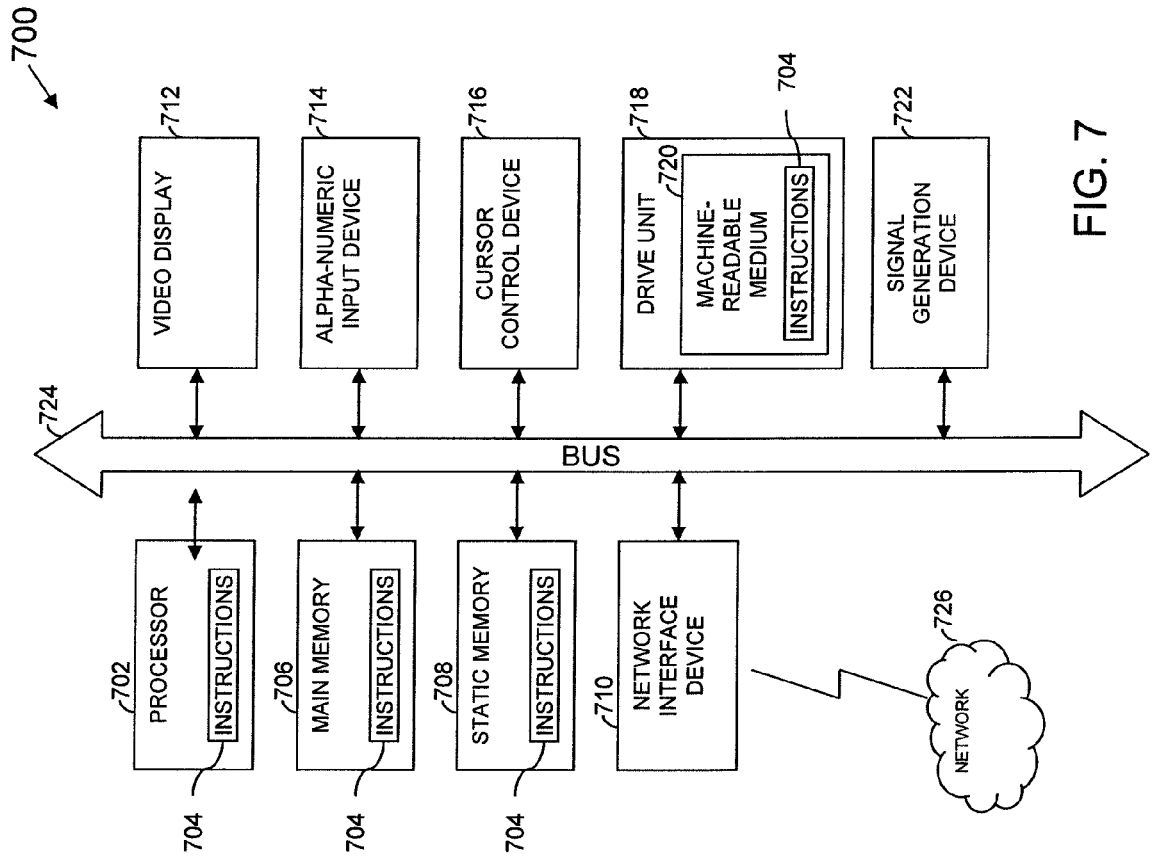
FIG. 7 illustrates a diagrammatic representation of a machine in the exemplary form of a computer system, within which a set or sequence of instructions for causing the machine to perform any one of the methodologies discussed herein may be executed.

As will be apparent to those skilled in the art, the methods described herein will typically be implemented in large part, if not entirely through software. In one preferred implementation, the security policies which collectively form the security profile will be provided by program developers. This, a machine readable medium containing instructions of an applications program, for example, will also contain a definition of policies for the applications program that may be used in the described method. FIG. 7 illustrates a diagrammatic representation of a machine in the exemplary form of a computing device 700 within which a set or sequence of instructions, for causing the machine to perform any one of the methodologies discussed herein, may be executed. In alternative embodiments, the machine may comprise a processing system, as discussed earlier herein. The computing device 700 includes a processor 702, a main memory 706 and a static memory 708, which communicate with each other via a bus 724. The computing device 700 may further include a video display unit 712 (e.g., a liquid crystal display (LCD) or a cathode ray tube (CRT)). The computing device 700 also includes an alphanumeric input device 714 (e.g., a keyboard), a cursor control device 716 (e.g., a mouse), a disk drive unit 718, a signal generation device 722 (e.g., a speaker) and a network interface device 710 to interface the computing device to a network 726.

The disk drive unit 718 includes a machine-readable medium 720 on which is stored a set of instructions or software 704 embodying any one, or all, of the methodologies described herein. The software 704 is also shown to reside, completely or at least partially, within the main memory 706 and/or within the processor 702. The software 704 may further be transmitted or received via the network interface device 710. For the purposes of this specification, the term "machine-readable medium" shall be taken to include any medium which is capable of storing or encoding a sequence of instructions for execution by the machine and that cause the machine to perform any one of the methodologies of the inventive subject matter. The term "machine-readable medium" shall accordingly be taken to include, but not be limited to, solid-state memories, optical and magnetic disks, and carrier wave signals. Further, while the software is shown in FIG. 7 to reside within a single device, it will be appreciated that the software could be distributed across multiple machines or storage media, which may include the machine-readable medium.

The foregoing description of specific embodiments reveals the general nature of the inventive subject matter sufficiently that others can, by applying current knowledge, readily modify and/or adapt it for various applications without departing from the generic concept. Therefore, such adaptations and modifications are within the meaning and range of equivalents of the disclosed embodiments. The phraseology or terminology employed herein is for the purpose of description and not of limitation. Accordingly, the inventive subject matter embraces all such alternatives, modifications, equivalents and variations as fall within the spirit and broad scope of the appended claims.

Method embodiments described herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMS), read only memories (ROMs), and the like.

In the foregoing description of various embodiments, reference is made to the accompanying drawings, which form a part hereof and show, by way of illustration, specific embodiments in which the inventive subject matter may be practiced. Various embodiments are described in sufficient detail to enable those skilled in the art to practice the inventive subject matter, and it is to be understood that other embodiments may be utilized, and that process or mechanical changes may be made, without departing from the scope of the inventive subject matter.

Embodiments of the inventive subject matter may be referred to, individually and/or collectively, herein by the term "inventive subject matter" merely for convenience and without intending to voluntarily limit the scope of this application to any single inventive subject matter or inventive concept if more than one is, in fact, disclosed. It will be recognized that the methods of various embodiments can be combined in practice, either concurrently or in succession. Various permutations and combinations may be readily apparent to those skilled in the art.

What is claimed is:

1. A method of operating a computing device having an operating system defining a kernel space and user space, comprising the acts of:
   causing the computing device to operate a program, the program having a plurality of intended functionalities, the program further having a set of one or more security profiles associated with the program;
   monitoring calls attempted by the program, the monitoring performed by monitoring operations in the kernel initiated in response to the attempted calls, the monitoring comprising intercepting a kernel operation at a point at which one or more arguments associated with the attempted calls have been resolved in the kernel for the kernel operation;
   determining whether the intercepted kernel operation initiated in response to the program is consistent with the security profiles associated with the program; and
   after determining that the intercepted kernel operation initiated in response to the program is consistent with the security profiles associated with the program, allowing execution of the intercepted kernel operation;
   wherein the act of determining whether the operation initiated in response to a program call is consistent with the security profiles associated with the program comprises correlating the intercepted kernel operation with the security profiles and determining if the attempted call operation is allowed by the security profiles.

2. The method of claim 1, wherein the act of monitoring is performed at least partially at the kernel level of the operating system.

3. The method of claim 2, wherein the program security profiles are loaded into memory in the kernel space of the operating system of the computing device.

4. The method of claim 1, wherein the program is an applications program.

5. A computing device, comprising:
   an electronic processor and memory;
   an operating system, the operating system defining a kernel space and a user space;
   at least one application implementable by the computing device;
   a set of operational permissions accessible to the computing device and operatively associated with the application, the operational permissions comprising permissions representative of operations in the kernel space of the operating system that are permitted, so as to enable functions in the application is allowed to perform;
   a monitoring system adapted to monitor operations in the kernel space initiated in response to system calls initiated by the application by intercepting the kernel operations before execution, wherein the kernel operations have resolved arguments associated with the operations; and
   a determination system configured to determine if the initiated kernel operations are permitted, the determination system adapted to make such determinations at least partially in response to the operational permissions for the application;
   a security policy virtual machine operating in the kernel space of the operating system, the virtual machine configured to test at least a portion of the intercepted kernel operations against the operation permissions based on compiled security profiles; and
   a decision module operating at least in part in the user space and configured to receive decision instructions referred from the security policy virtual machine, and to resolve the referred decision instructions.

6. The computing device of claim 5, wherein the monitoring system and the determination system are implemented by the operating system of the computing device.

7. The computing device of claim 5, wherein the determination system operates at least in part in the kernel space of the operating system.

8. The computing device of claim 5, wherein the operational permissions for the application comprise instructions for the virtual machine to refer selected decisions to the decision module.

9. A non-transitory machine readable storage medium containing instructions, which when implemented by a machine, cause operations to be performed which comprise the following:
   monitoring actions attempted by an application running on the machine by intercepting kernel operations initiated in response to actions initiated by the application;
   functionally correlating at least one of the kernel operations initiated in response to the application to at least one of a plurality of predetermined policies for the application, the plurality of policies containing at least a first policy indicative of an operation which is necessary for the application to provide a predetermined functionality; and
   gating at least one monitored action of the application at least partially in response to the functional correlation of the kernel operation with the first policy;
   implementing a security policy virtual machine operating in the kernel space of the operating system, the virtual machine configured to execute a compiled security profile representing the predetermined policies.

10. A method of implementing security containment for at least one selected application operated on a computing device, the computing device comprising a processor; a memory and an operating system having a kernel space and a user space, the method comprising:
   using the processor to access a plurality of security policies, the policies indicative of processes for determining whether the application completes selected system calls, by determining the permissibility of selected operations in the kernel initiated in response to the system calls;
   using the processor to identify a system call initiated by the application, and trap kernel operations initiated in response to the system call;
   comparing the initiated kernel operations with the security policies, without executing the kernel operations; and
   in the operation that the initiated kernel operation is addressed by the security policies, allowing or denying the execution of the kernel operation in accordance with the security policies;
   wherein the act of comparing initiated kernel operations with the security policies comprises:
      testing a first group of initiated kernel operations against the security policies within the kernel space; and
      testing a second group of initiated kernel operations against the security policies by an extension module operating in user space, wherein the second group of initiated kernel operations comprise operations requiring user input to resolve.

11. The method of claim 10, wherein the policies identify initiated kernel operations which is tested in the extension module.

12. The method of claim 10, wherein the step of comparing is performed by the computing device operating system at the kernel level.

13. The method of claim 10, wherein the application is a user-level application.

14. A method of providing security for a computer comprising a processor a memory and having an operating system and operating at least one user application, the operating system having a kernel space and a user space, and having a system level application program interface layer between the kernel space and the user space, the method comprising the steps of:
- opening the user application on the computer;
- using the processor to communicate a notification to a monitoring module in the user space of the operating system that the program was opened; and
- in response to the notification, using the processor to replace a first security profile for the program in the kernel layer of the operating system, the security profile containing machine language operations for determining if certain operations initiated in the kernel in response to actions initiated by the application are to be allowed or denied;
- using the security profile to determine if the security profile establishes a policy by which a first kernel operation is to be permitted or denied; and
- if the security profile establishes the policy by which the first kernel operation is to be permitted or denied, permitting or denying the operation in accordance with the established policy;
- wherein the security profile establishes that determination of a kernel operation is identified as a decision process outside of the kernel to determine if the initiated kernel operation is to be permitted or denied.

15. The method of claim 14, wherein the decision process requests the user for input affecting whether the initiated call is to be permitted or denied.

16. A computing device, comprising:
- an electronic processor and memory;
- at least one application implementable by the computing device;
- a set of operational permissions accessible to the computing device and operatively associated with the application, the operational permissions comprising permissions representative of actions the application is permitted to perform;
- a monitoring system adapted to monitor actions initiated by the application when it is implemented by the computer, the monitoring system located within kernel space of an operating system on the computing device, the monitoring system operating by intercepting kernel operations initiated in response to actions initiated by the application; and
- a determination system configured to determine if actions attempted by the application allowed by correlating the intercepted kernel operations with one or more security profiles defining operational permissions for the application.

17. A method of providing security for a computing device comprising a processor a memory and having an operating system and operating at least one user application, the operating system having a kernel level and a user level, and having a system level application program interface layer between the kernel level and the user level, the method comprising the steps of:
- opening the user application on the computer;
- recognizing in the user level of the operating system that the program was opened;
- in response to the recognition of the opening of the user application, placing a security profile for operation of the program in the kernel level of the operating system, the security profile containing machine language operations for determining if operations initiated in the kernel in response to a call by the application is allowed or denied;
- intercepting at least selected kernel operations initiated in response to system calls at the system level application program interface layer initiated by the application, the intercepting performed at a level within the kernel and outside the system level application program interface layer;
- correlating at least a first set of the intercepted kernel operations to the security profile to determine if the security profile establishes a privilege by which each kernel operation is to be permitted or denied, the correlating performed within the kernel level of the operating system; and
- permitting or denying a kernel operation in accordance with the correlation of the operation to the security profile;
- wherein the security profile contains instructions that at least one kernel operation is to be evaluated outside the kernel, and wherein such an operation and a privilege related to that operation are referred to a decision module in user space.

18. The method of claim 17, wherein kernel operations requiring input from a user are referred out of the kernel for resolution.

\* \* \* \* \*